United States Patent [19]

Bucalo

[11] 3,831,584

[45] Aug. 27, 1974

[54] DEVICES FOR CONTROLLING FLUID FLOW IN LIVING BEINGS

[75] Inventor: Louis Bucalo, Holbrook, N.Y.

[73] Assignee: Investors in Ventures, Inc., New York, N.Y.

[22] Filed: Feb. 14, 1973

[21] Appl. No.: 332,554

Related U.S. Application Data

[62] Division of Ser. No. 155,141, June 21, 1971, Pat. No. 3,742,933.

[52] U.S. Cl. ............................. 128/1 R, 128/334 C
[51] Int. Cl. .......................................... A61b 19/00
[58] Field of Search.... 128/1 R, 274, 303 R, 334 R, 128/334 C, 348

[56] References Cited
UNITED STATES PATENTS

| | | | |
|---|---|---|---|
| 2,810,134 | 10/1957 | Radin | 3/13 |
| 3,613,661 | 10/1971 | Shah | 128/1 R |
| 3,704,704 | 12/1972 | Gonzales | 128/1 R |
| 3,707,957 | 1/1973 | Bucalo | 128/1 R |

*Primary Examiner*—Dalton L. Truluck
*Attorney, Agent, or Firm*—Steinberg & Blake

[57] ABSTRACT

A device for controlling the flow of fluid in a living creature. The device has an inlet and outlet both of which are mounted fluid-tightly in a body cavity in a position compelling the fluid which is to be controlled to flow into said inlet before reaching the outlet. Between the inlet and outlet there is a control structure which in one position provides for flow of fluid in a given condition through the inlet and the outlet and which in another position prevents the flow of fluid in this given condition through the inlet and outlet. This control structure can provide for fluid flow at all times while chemically treating the fluid to prevent it from having a given condition, or the control structure can in one position cut off the flow of fluid and in another position reestablish the flow of fluid.

4 Claims, 3 Drawing Figures

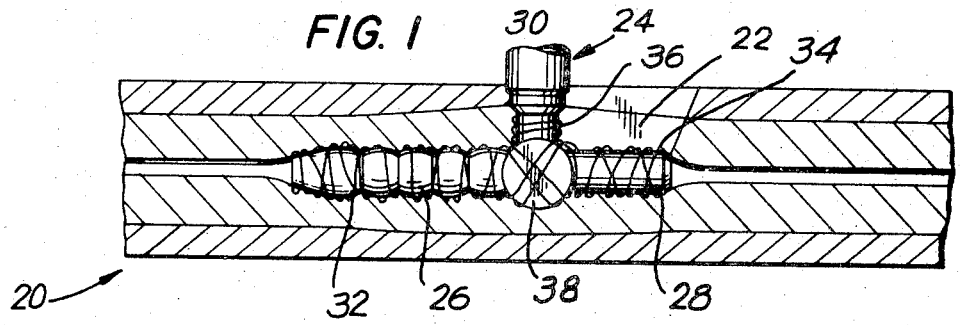
FIG. 1
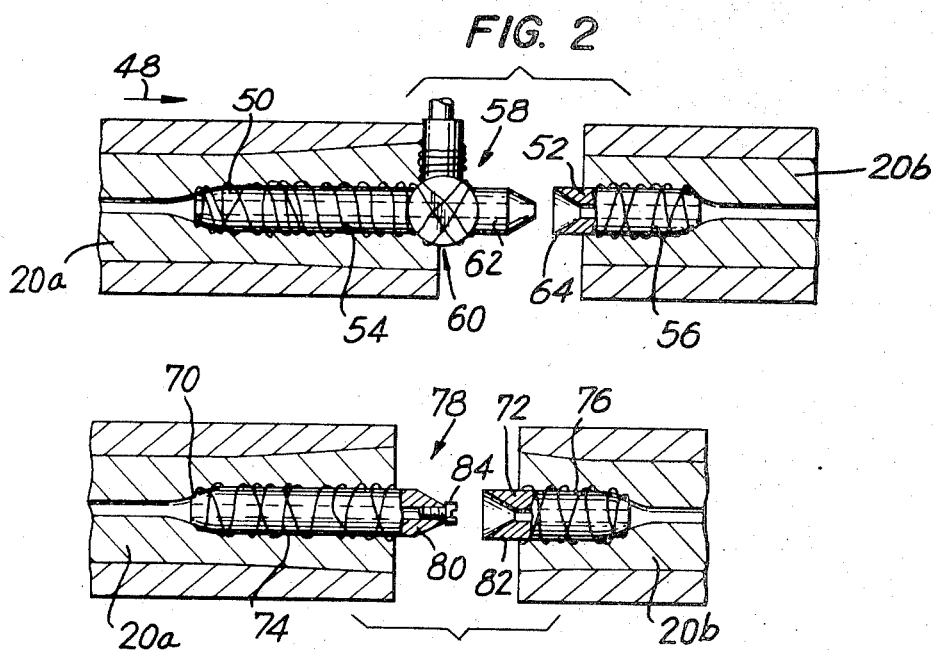
FIG. 2
FIG. 3

DEVICES FOR CONTROLLING FLUID FLOW IN LIVING BEINGS

CROSS REFERENCE TO RELATED APPLICATION

This application is a division of copending application Ser. No. 155,141, now U.S. Pat. No. 3,742,933, filed June 21, 1971, and entitled "Devices For Controlling Fluid Flow In Living Creatures".

BACKGROUND OF THE INVENTION

The present invention relates to devices for controlling the flow of fluid in body cavities.

For example, the present invention relates to devices which are adapted to be used in a human vas for controlling the flow of fluid therethrough.

One of the problems encountered in controlling the flow of fluid in living creatures is that very often changes which are made are irreversible. For example, if, after a vasectomy has been performed, an individual seeks to again reestablish flow of fluid with viable sperm, it frequently occurs that a return to the original condition of the vas is not possible. Experience has shown that once a vasectomy has been performed, it is only possible in substantially less than 50 percent of the known cases to reestablish the flow of fluid with viable sperm if an individual should decide to terminate the sterile condition achieved with the vasectomy.

As is well known, one of the great problems presently encountered is population control. It has been proposed to bring about population control by way of vasectomies. However, one of the primary drawbacks encountered with vasectomies is the irreversibility thereof. Once the operation is performed, an individual cannot be assured that the flow of fluid with viable sperm can be reestablished in a reliable manner.

If it were possible to assure an individual that whenever desired the vas could be returned to a condition where it would function in the same way as before the vasectomy, many more individuals would have this operation performed.

A further problem encountered in connection with operations which cut off the flow of fluid in living creatures is that many individuals feel that it is unwise to block the flow of fluid in the body, even though as a practical matter there is no sound basis for such opinions. This belief that the blocking of the flow of fluid in the body is unwise also accounts for a lesser number of operations such as vasectomies.

SUMMARY OF THE INVENTION

It is accordingly a primary object of the present invention to provide devices which will avoid the above drawbacks.

Thus, it is a primary object of the present invention to provide a device which while capable of preventing the flow of fluid in a given condition at the same time can readily reestablish the flow of fluid in the desired condition.

It is also an object of the present invention to provide a device capable of operating in such a way that it can cut off the flow of fluid and will at the same time be capable of reliably reestablishing the flow of fluid when desired.

Furthermore, it is an object of the present invention, specifically in the case of a human vas, to provide a device which can cut off the flow of fluid through the vas while at the same time being capable at any time of reliably reestablishing the flow of fluid through the vas.

According to the invention the device includes an inlet means and an outlet means as well as a pair of mounting means for respectively mounting the inlet means and the outlet means fluid-tightly in a body cavity. Between the inlet and outlet means is a control means coacting with the inlet means and outlet means for establishing the flow of fluid in a given condition through the inlet means and outlet means in one position of the control means and for preventing flow of fluid in a given condition through the inlet means and outlet means in another position of the control means.

BRIEF DESCRIPTION OF DRAWINGS

The invention is illustrated by way of example in the accompanying drawings which form part of this application and in which:

FIG. 1 is a schematic longitudinal sectional elevation of a vas with a device of the invention situated therein;

FIG. 2 is a schematic longitudinal partly sectional elevation of one embodiment of a device of the invention; and FIG. 3 is a schematic fragmentary longitudinal partly sectional elevation of a second embodiment of a device according to the present invention.

DESCRIPTION OF PREFERRED EMBODIMENTS

Referring to FIG. 1, there is illustrated therein, in a schematic manner, a section of a human vas 20. An incision 22 is formed in a part of the vas 20, so that the device 24 of the present invention can be situated within the vas in the manner shown in FIG. 1. This device 24 is in the form of a valve having an elongated tubular inlet means 26 and an elongated tubular outlet means 28. This valve may be placed in the illustrated example in a pair of different positions by rotation of the stem 30 in any suitable way. It will be noted that the stem 30 extends to the exterior of the vas through the incision 22.

A pair of mounting means are provided for mounting the inlet means 26 and the outlet means 28 fluid-tightly within the body cavity formed by the vas 20 in the example of FIG. 1. This pair of mounting means 32 and 34 takes the form of fine gold wire lengths wound around the exterior of the tubular inlet and outlet means for promoting the growth of tissue in the interstices between the fine gold wire so that the tissue grows around the inlet means and outlet means providing a perfectly fluid-tight mounting thereof. The gold wire mounting means 32 and 34 can either take the form of separate lengths of wire or a single continuous length of wire having the portions 32 and 34, and a part 36 of the wire can also be wound around the neck of the valve through which the stem 30 extends, so that when the incision 22 heals the healing tissue will grow along the wire 36 and will be directed therefrom to the wires 32 and 34 for promoting the growth of tissue to provide the fluid-tightly mounting. Some of the wire may also extend around the exterior housing 38 of the valve 24. In the case of certain individuals there will not be a confident feeling of absolute prevention of conception unless the flow is completely blocked, and at the same time such individuals will hesitate to have vasectomies performed because if they should change their mind the vas cannot be returned to its original functioning with any reliability. In order to solve this latter problem the device of FIGS. 2 and 3 may be used.

Referring to FIG. 2, it will be seen that the vas has been separated into the portion 20a and 20b. Thus a vasectomy has been performed cutting completely through the vas. In this case the vas portion 20a in which the fluid normally flows toward the right, as viewed in FIG. 2, as indicated by the arrow 48, is provided with an elongated tubular inlet means 50, while the vas portion 20b which normally would receive the fluid from the vas portion 20a is provided with an elongated outlet means 52. The inlet means 50 and the outlet means 52 are both in the form of elongated tubes formed with passages therein which have opposed open ends. In order to mount the inlet means 50 and the outlet means 52 fluid-tightly within the vas portions 20a and 20b a pair of mounting means in the form of lengths of gold wire 54 and 56 are provided. After the vasectomy has been performed, the free ends of the vas portions 20a and 20b will heal, and they heal directly at portions of the fine gold wire 54 and 56 so that as the new tissue grows it is directed by the gold wire lengths 54 and 56 along the exterior of the tubular inlet means 50 and outlet means 52, thus providing a fluid-tight mounting of the inlet means 50 and outlet means 52 in the vas portions 20a and 20b.

The control means 58 of this embodiment includes a valve 60. The stem of the valve 60 can be turned either to open or close the valve.

In addition the control means 58 includes a coupling 62 connected to the valve 60 to receive fluid which flows through the inlet means 50 when the valve 60 is placed in its open position. The end of the outlet means 52 which is directed toward the valve 60 is provided with a coupling 64 which may be formed integrally with the outlet means 52, and the valve 60 together with the coupling structure 62, 64 forms the control means 58 of the embodiment of FIG. 2. The couplings 62 and 64 in the illustrated example take the form of simple tapered components which can be wedged together for reliably establishing a secure connection between the valve 60 and the outlet means 52 and which can be simply separated, as indicated in FIG. 2, for uncoupling the outlet means 52 from the valve 60.

Thus, with this embodiment after the vasectomy has been performed the physician will introduce the inlet means 50 into the vas portion 20a and the outlet means 52 into the vas portion 20b. As the vas heals the tissue will grow along the wire portions 54 and 56 for providing the fluid-tight mounting of the inlet means 50 and outlet means 52 in the vas portions 20a and 20b respectively. The valve 60 and coupling 62 are fixed permanently with the inlet means 50 so that they will assume the position shown in FIG. 2 when the inlet means 50 is introduced into the vas portion 20a. When the flow of fluid containing sperm is to be blocked, the valve 60 is placed in a closed position and the coupling components 62 and 64 are uncoupled from each other so that an exceedingly reliable prevention of flow of fluid to the vas portion 20b is achieved. However, whenever it is desired to reestablish the flow, the coupling component 62 and 64 can be connected together and then the valve 60 can be placed in an open position, so that in this way an unobstructed flow of fluid from the vas portion 20a to the vas portion 20b can be reestablish in a highly reliable manner.

According to the embodiment of the invention which is illustrated in FIG. 3, the vas portions 20a and 20b which are severed from each other also respectively have an inlet means 70 and an outlet means 72 situated therein. The inlet means 70 has a mounting means in the form of a gold wire 74 and the outlet means 72 has a mounting means in the form of a gold wire 76. These lengths of fine gold wire function in a manner described above to promote the growth of tissue around the elongated tubular inlet and outlet means for providing a fluid-tight mounting thereof within the vas portions. The inlet means 70 and outlet means 72 are in the form of simple elongated tubes formed with interior passages having opposed open ends.

The control means 78 of this embodiment includes a pair of coupling members 80 and 82. These coupling members may be formed integrally with the inlet means 70 and outlet means 72, respectively, the coupling member 80 having an exterior tapered surface adapted to be received at the interior tapered surface of the coupling 82, forming a wedged secure engagement therethrough when the coupling components 80 and 82 are connected together. The free end of the coupling 80 is internally threaded to receive a plug 84 which can be readily threaded into the coupling 80 for closing the latter.

When it is desired to block the flow of fluid so that flow of fluid in a condition having viable sperm therein from the vas portion 20a to the vas portion 20b is prevented, the control means 78 is placed in the position shown in FIG. 3 where the coupling elements 80 and 82 are uncoupled from each other and the plug 84 is carried by the coupling 80 to close the latter and thus prevent fluid from flowing beyond the inlet means 70.

When it is desired to reestablish the original condition of the vas, it is only necessary to remove the plug 84 and couple elements 80 and 82 together, so that a continuous passage will now be formed through the inlet means 70 and outlet means 72, and in this way it is possible to establish with reliability the initial operating condition of the vas.

It is thus apparent from the above description that for these individuals who feel that conception can be reliably prevented only when the flow of fluid is blocked, the embodiments of FIGS. 2 and 5 may be used, and in this case it is possible whenever desired to reestablish the original operating condition of the vas in a highly reliable manner.

What is claimed is:

1. In a device for regulating the flow of fluid in the body of a living creature, inlet means and outlet means for respectively receiving and discharging the fluid, a pair of mounting means coacting with said inlet means and outlet means for respectively mounting said inlet and outlet means fluid-tightly in a body cavity with said inlet means situated in the path of fluid flow so that the fluid must first flow into said inlet means before reaching said outlet means, control means operatively connected only to said inlet means either for establishing flow of fluid through said inlet and outlet means, in one position of said control means, or for preventing flow of fluid through said inlet and outlet means in another position of said control means, and coupling means on said inlet and outlet means releasably coupling said inlet and outlet means together, said coupling means being operatively connected with said inlet means and outlet means for coupling them to each other when said control means is in said one position for establishing flow of fluid through said inlet and outlet means and for uncoupling said inlet and outlet means from each other when said control means is in said other position preventing the flow of fluid through said inlet and outlet means.

2. The combination of claim 1 and wherein said pair of mounting means respectively include means carried by said inlet and outlet means for promoting the growth of tissue at the exterior of said inlet and outlet means to achieve the fluid-tight mounting thereof in the body cavity.

3. The combination of claim 1 and wherein said inlet and outlet means are respectively mounted by said pair of mounting means on portions of the body cavity which are separated from each other, said inlet means including a tubular inlet and said outlet means including a tubular outlet, said control means including a valve connected with said inlet means for opening the latter when said control means is in said one position and for closing the said inlet means when said control means is in said other position thereof.

4. The combination of claim 1 and wherein said inlet means and outlet means are respectively in the form of a pair of tubular members respectively mounted by said pair of mounting means in parts of the body cavity which are separated from each other, said coupling means including couplings respectively carried by said inlet means and outlet means for interconnecting said inlet and outlet means or for disconnecting said inlet and outlet means from each other, and said control means including a plug carried by said inlet means for closing the latter means when said couplings are uncoupled for placing said control means in said other position thereof, said plug being removed and said couplings being joined to interconnect said inlet means and outlet means when said control means is in said one position thereof.

* * * * *